(12) United States Patent
Depay et al.

(10) Patent No.: US 7,219,866 B2
(45) Date of Patent: May 22, 2007

(54) SPRING LOADED CLAMPING MECHANISM

(75) Inventors: Dean Depay, San Jose, CA (US); Benjamin Abraham, Cupertino, CA (US); Frederic Frappereau, Los Gatos, CA (US); Ray Gradwohl, Los Gatos, CA (US); Jacques Gagne, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 69 days.

(21) Appl. No.: 11/180,472

(22) Filed: Jul. 13, 2005

(65) Prior Publication Data
US 2007/0012833 A1    Jan. 18, 2007

(51) Int. Cl.
*A47B 96/06* (2006.01)
(52) U.S. Cl. .......................... 248/229.22; 248/231.41; 248/918
(58) Field of Classification Search .............. 248/229.1, 248/229.13, 229.16, 229.2, 229.23, 229.26, 248/228.3, 230.3, 231.41, 231.31, 228.2, 248/230.2, 229.21, 229.11, 176.1, 127, 917, 248/918, 919, 920, 921, 922, 923, 924, 229.22; 24/3.11, 3.12, 457; 269/3, 6, 43, 95, 71, 269/73; 108/28
See application file for complete search history.

(56) References Cited

U.S. PATENT DOCUMENTS

| | | | | |
|---|---|---|---|---|
| 6,481,681 B1 * | 11/2002 | Stunkel et al. | ......... | 248/231.31 |
| 6,663,066 B1 * | 12/2003 | Hong | ..................... | 248/231.41 |
| 6,679,463 B1 | 1/2004 | Chen | | |
| 7,093,811 B2 * | 8/2006 | Wu | ........................ | 248/229.12 |
| D527,755 S * | 9/2006 | Wu | ............................. | D16/202 |
| 2005/0230583 A1 * | 10/2005 | Wu | ....................... | 248/231.41 |
| 2006/0170817 A1 * | 8/2006 | Wu | ............................. | 348/373 |

FOREIGN PATENT DOCUMENTS

EP    1 001 617 A2    5/2000

* cited by examiner

*Primary Examiner*—Carl D. Friedman
*Assistant Examiner*—Colin K. S. Barrows

(57) ABSTRACT

A clamping device for rigidly securing a web camera, or other object, to a monitor. The clamping device includes a body portion and a clamping portion. Springs are provided within the device that allow the clamping portion to be slid away from the body portion against the bias of the springs. A first flipper is mounted to one side of the body portion and a second flipper is mounted to an opposite side of the body portion. The clamping device is positioned on the top edge of the monitor so that a front support portion of the clamping portion is positioned against a front surface of the monitor above the screen and the flippers are positioned against a back panel of the monitor. The spring tension between the clamping portion and the flippers rigidly secures the clamping device to the monitor.

29 Claims, 5 Drawing Sheets

SPRING LOADED CLAMPING MECHANISM

BACKGROUND OF THE INVENTION

1. Field of the Invention

This invention relates generally to a device for mounting an object to a computer monitor and, more particularly, to a spring loaded clamping device for mounting a web camera to a computer monitor, where the clamping device includes rotatable flippers having ribs that can be inserted into ventilation slots in a back panel of the monitor.

2. Discussion of the Related Art

Web cameras are known in the art for transmitting video over the internet. The web camera is sometimes mounted to a monitor associated with a computer from which a user accesses the internet so that an image of the user can be transmitted to other persons who the user may be communicating with over the internet. Effectively securing the web camera to the monitor provides certain design challenges. Known devices for securing a web camera to a monitor have heretofore been unreliable in that the devices easily fall off the monitor or shift out of position in response to the slightest tug on the camera's connection cable. Therefore, it is desirable to provide a securing device that more reliably secures a web camera to a computer monitor.

SUMMARY OF THE INVENTION

In accordance with the teachings of the present invention, a clamping device is disclosed that reliably secures a web camera, or other object, to a computer monitor. The clamping device includes a body portion and a clamping portion. Springs are provided within the device that allow the clamping portion to be moved away from the body portion against the bias of the springs. A first flipper is rotatably mounted to one side of the body portion and a second flipper is rotatably mounted to an opposite side of the body portion. The clamping device is positioned on the top edge of the monitor so that a front support portion of the clamping portion is positioned against a front surface of the monitor above the screen and the flippers are positioned against a back panel of the monitor. The spring tension between the clamping portion and the flippers rigidly secures the clamping device to the monitor.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a clamping device for securing an object to a computer monitor is merely exemplary in nature, and is in no way intended to limit the invention or its applications or uses. Particularly, the discussion below will describe a clamping device for effectively clamping a web camera to a computer monitor. However, the clamping device of the invention has application for clamping other objects to a computer monitor.

Figure 1:
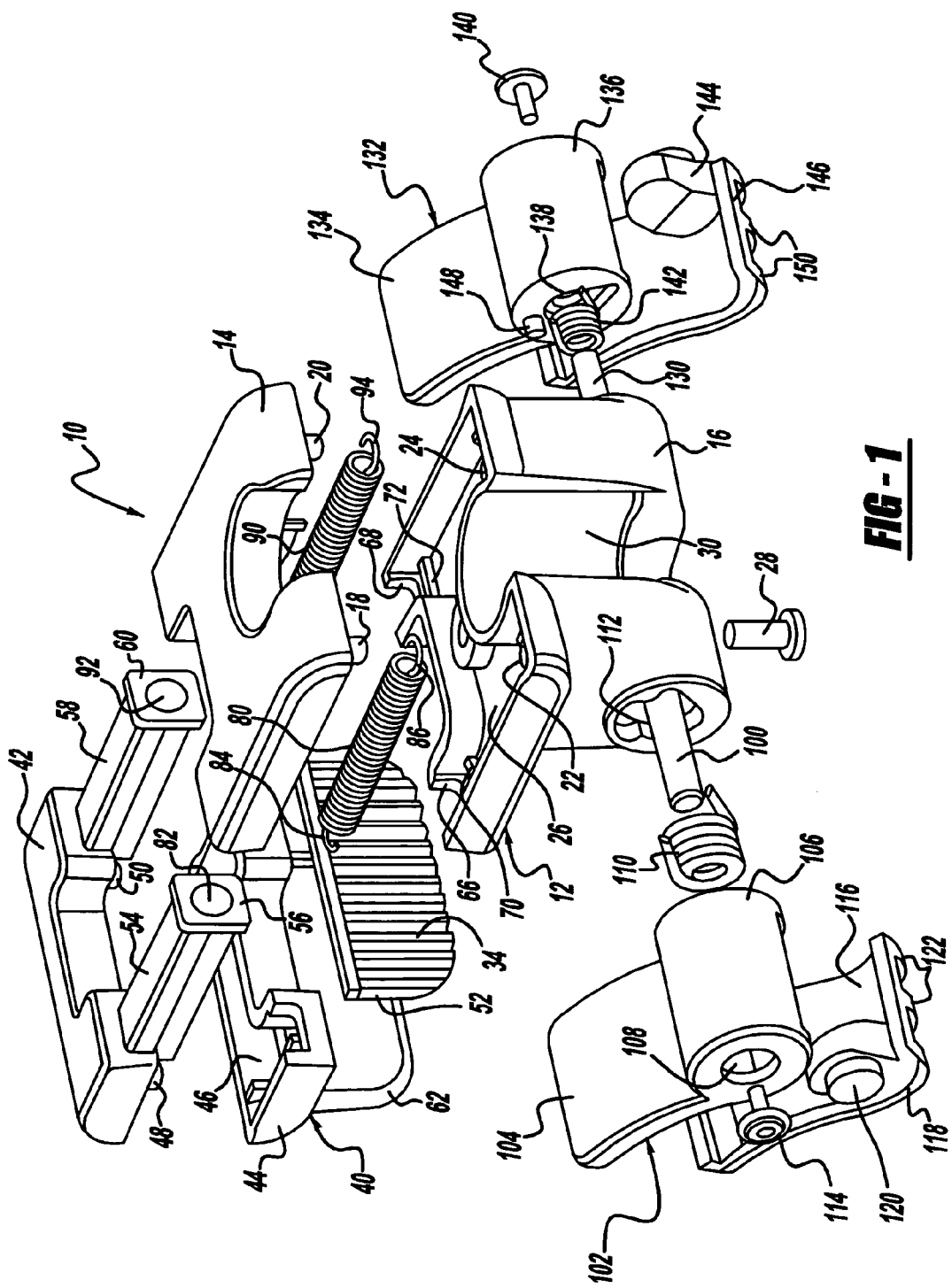
FIG. 1 is a blown-apart perspective view of a clamping device for securing an object to a computer monitor, according to an embodiment of the present invention.
Figure 2:
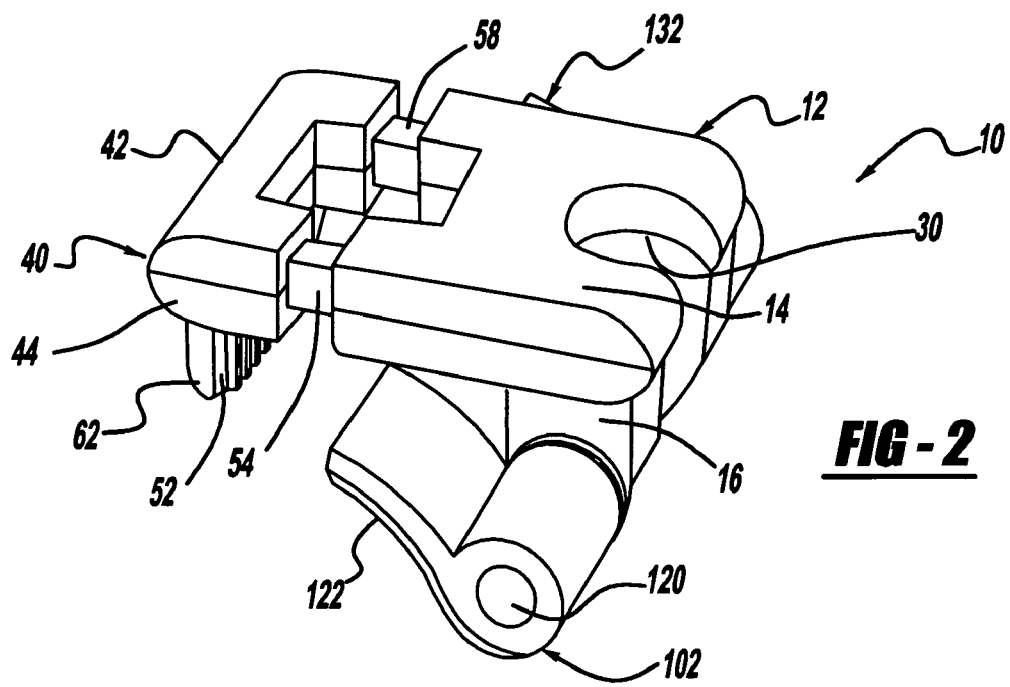
FIG. 2 is a perspective view of the clamping device shown in FIG. 1.
Figure 3:
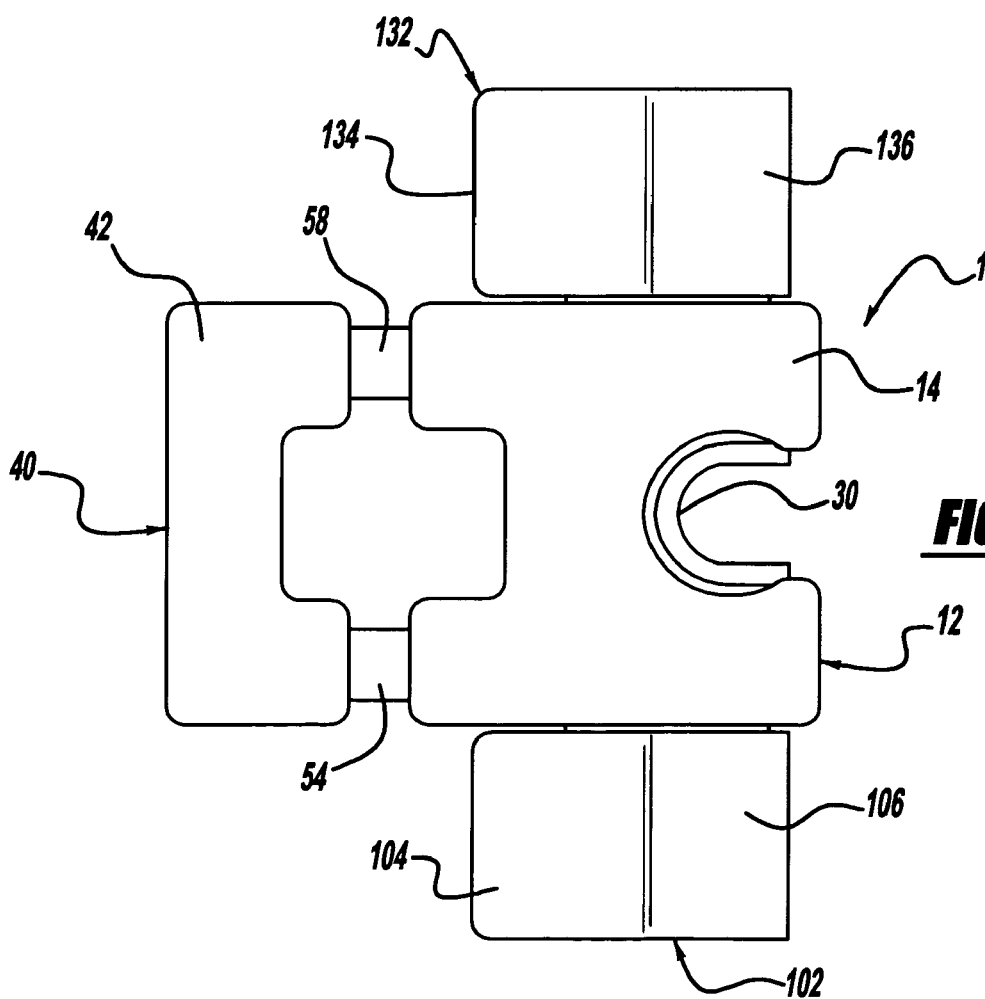
FIG. 3 is a top view of the clamping device shown in FIG. 1.
Figure 4:
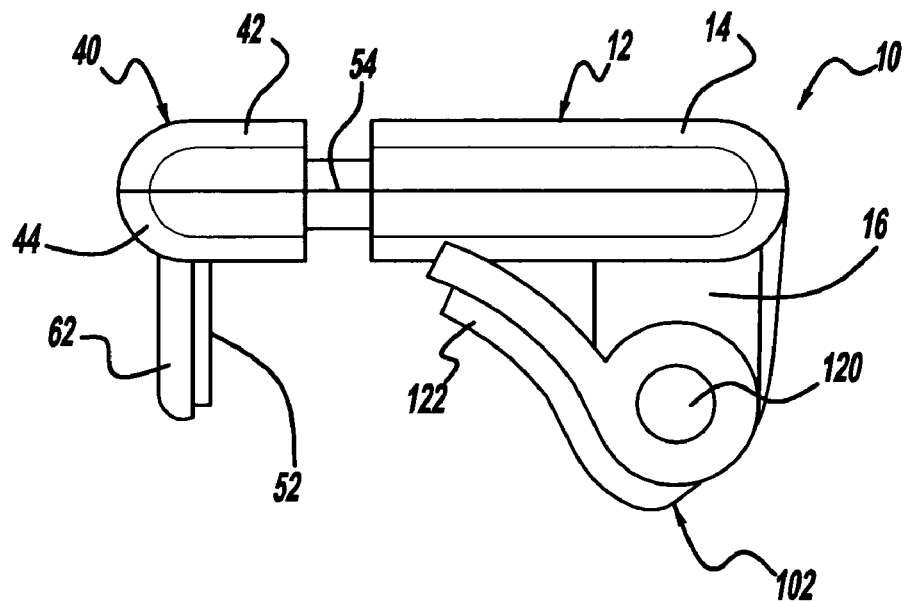
FIG. 4 is a side view of the clamping device shown in FIG. 1.
Figure 5:
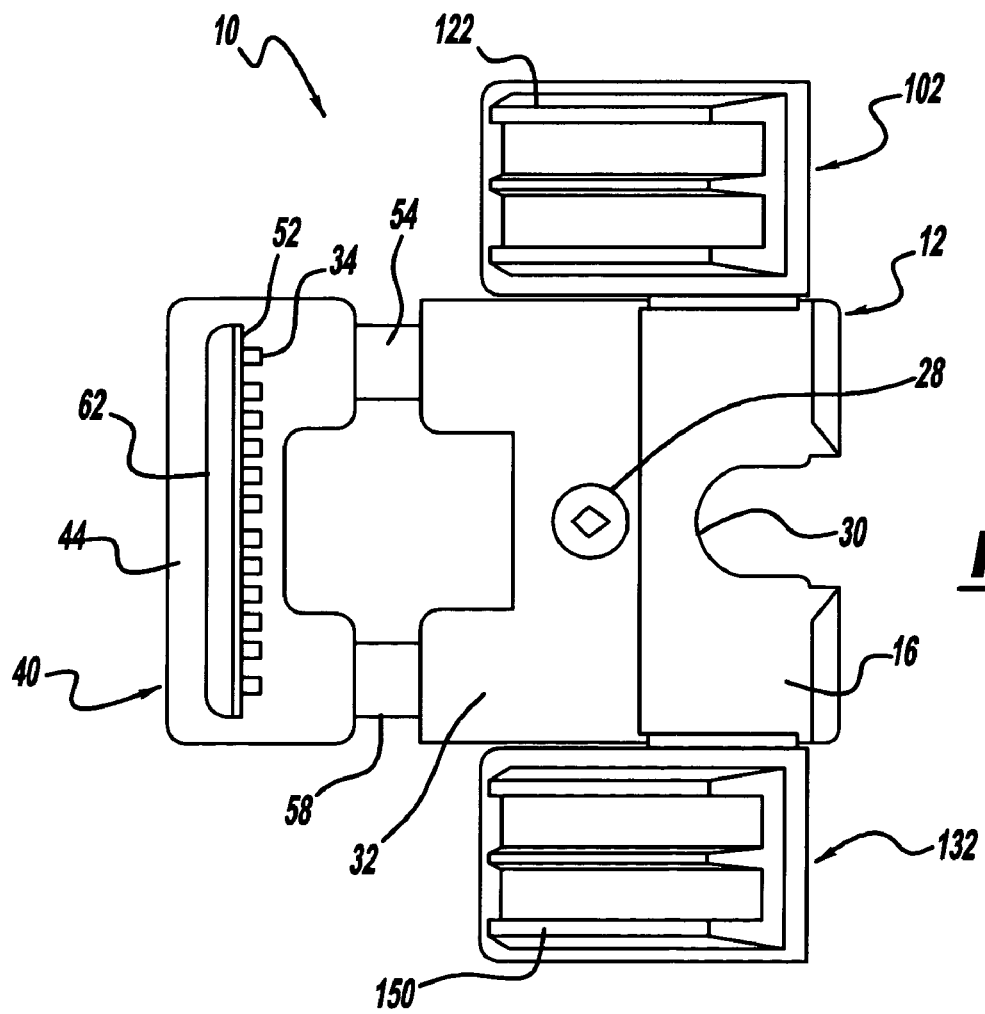
FIG. 5 is a bottom view of the clamping device shown in FIG. 1.
Figure 6:
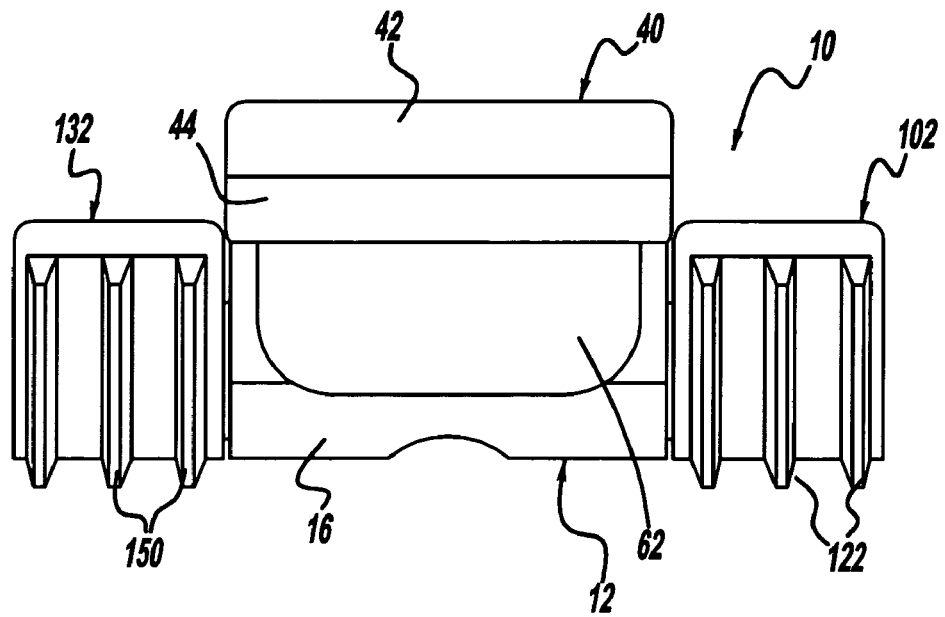
FIG. 6 is a front view of the clamping device shown in FIG. 1.
Figure 7:
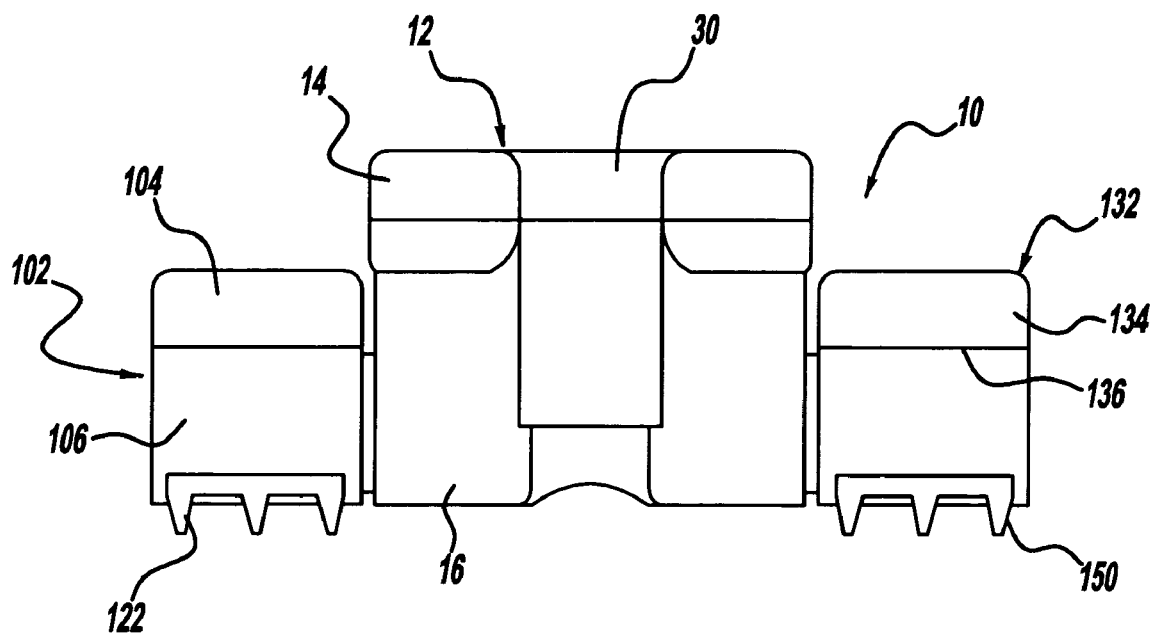
FIG. 7 is a back view of the clamping device shown in FIG. 1.

FIG. 1 is a blown-apart perspective view, FIG. 2 is a perspective view, FIG. 3 is a top view, FIG. 4 is a side view, FIG. 5 is a bottom view, FIG. 6 is a front view and FIG. 7 is a back view of a clamping device 10 for mounting an object, such as a web camera, to a computer monitor, according to an embodiment of the present invention. As will be appreciated by those skilled in the art, the clamping device 10 of the invention may have application for clamping any suitable object to a computer monitor. In one embodiment, the clamping device 10 is an assembly of plastic molded parts that are secured together in a snap fit arrangement. However, it is within the scope of the present invention that the clamping device 10 includes any suitable materials assembled in any suitable manner, consistent with the claims.

The clamping device 10 includes a body portion 12 having a top portion 14 and a bottom portion 16 defining a cavity 26 within the body portion 12. The top portion 14 and the bottom portion 16 also define a cylindrical channel 30 that accepts a mounting portion of a web camera, or other object, as will be discussed in more detail below. The top portion 14 includes pins 18 and 20 extending into the cavity 26 that are positioned within corresponding openings 22 and 24 in the bottom portion 16. A bolt 28 is threaded through a bottom surface 32 of the bottom portion 16 to secure the top portion 14 to the bottom portion 16.

The clamping device 10 also includes a clamping portion 40 having a top portion 42 and a bottom portion 44 defining a cavity 46 therein. The top portion 42 includes pins 48 and 50 extending into the cavity 46. The bottom portion 44 includes a rectangular extended member 62 to which is mounted a resilient member 52 by adhesive or the like. The resilient member 52 includes parallel ribs 34 that provide a gripping force for purposes that will become apparent from the discussion herein. The resilient member 52 can be made of any suitable material, such as rubber.

The top portion 42 includes a first leg 54 having an end plate 56 and a second leg 58 having an end plate 60. Prior to the top portion 14 being secured to the bottom portion 16, the end of the leg 54 including the plate 56 is positioned within the cavity 26 where the leg 54 extends through a recess 66. Likewise, an end of the leg 58 including the plate 60 is positioned in the cavity 26 where the leg 58 extends through a recess 68. A back side of the plate 56 is positioned against an edge stop 70 within the cavity 26 and a back side of the plate 60 is positioned against an edge stop 72 within the cavity 26. In this manner, the clamping portion 40 is slidable relative to the body portion 12, where the legs 54 and 58 move into and out of the cavity 26 through the recesses 66 and 68 and are prevented from being completely removed from the body portion 12 by the edge stops 70 and 72.

A spring 80 is positioned within a central bore 82 of the leg 54. A first hook end 84 of the spring 80 is hooked to the pin 48 and a second hook end 86 of the spring 80 is hooked to the pin 18. Likewise, a spring 90 is positioned within a central bore 92 of the leg 58. A first hook end (not shown) of the spring 90 is hooked to the pin 50 and a second hook end 94 of the spring 90 is hooked to the pin 20. Therefore, the clamping portion 40 is slidable away from the body portion 12 against the bias of the springs 80 and 90.

A shaft 100 extends from one side of the bottom portion 16. A flipper 102 is rotatably mounted to the shaft 100. The flipper 102 includes a lever portion 104 and a cylindrical base portion 106. The shaft 100 extends into an opening 108 in the base portion 106, and a bolt 114 secures the flipper 102 to the shaft 100. A torsional spring 110 is positioned on the shaft 100 within the base portion 106. One end of the spring 110 is positioned within an opening (not shown) in the bottom portion 16 and an opposite end of the spring 110 is positioned within an opening (not shown) within the base portion 106. A pin (not shown) extending from the base portion 106 is positioned within a specially configured opening 112 proximate a base of the shaft 100. When the flipper 102 is rotated on the shaft 100, the pin and the opening 112 provide a limit stop to limit the range of rotation of the flipper 102, such as 90° of rotation. A flipper lower portion 116 is secured to the lever portion 104 and the base portion 106 in a snap fit engagement so that a cylindrical member 120 is positioned within an end of the opening 108. A rubber pad member 118 is secured to the lower portion 116 by adhesive or the like. The rubber pad member 118 includes three parallel ribs 122 that will be inserted within ventilation slots of the computer monitor, as will be discussed in more detail below.

A shaft 130 extends from an opposite side of the bottom portion 16 from the shaft 110, and a flipper 132 is rotatably mounted to the shaft 130. The flipper 132 includes a lever portion 134 and a cylindrical base portion 136. The shaft 130 extends into an opening 138 of the base portion 136, and a bolt 140 secures the flipper 132 to the shaft 130. A torsional spring 142 is positioned on the shaft 130 to provide spring tension for the rotation of the flipper 132, as discussed above for the flipper 102. A pin 148 extending from the base portion 136 is positioned within a specially configured opening in the bottom portion 16 to provide a limit stop, as discussed above for the flipper 102. A flipper lower portion 144 is snap fit to the lever portion 134 and the base portion 136. A rubber pad member 146 is secured to the lower portion 144, where the pad member 144 includes ribs 150.

Figure 8:
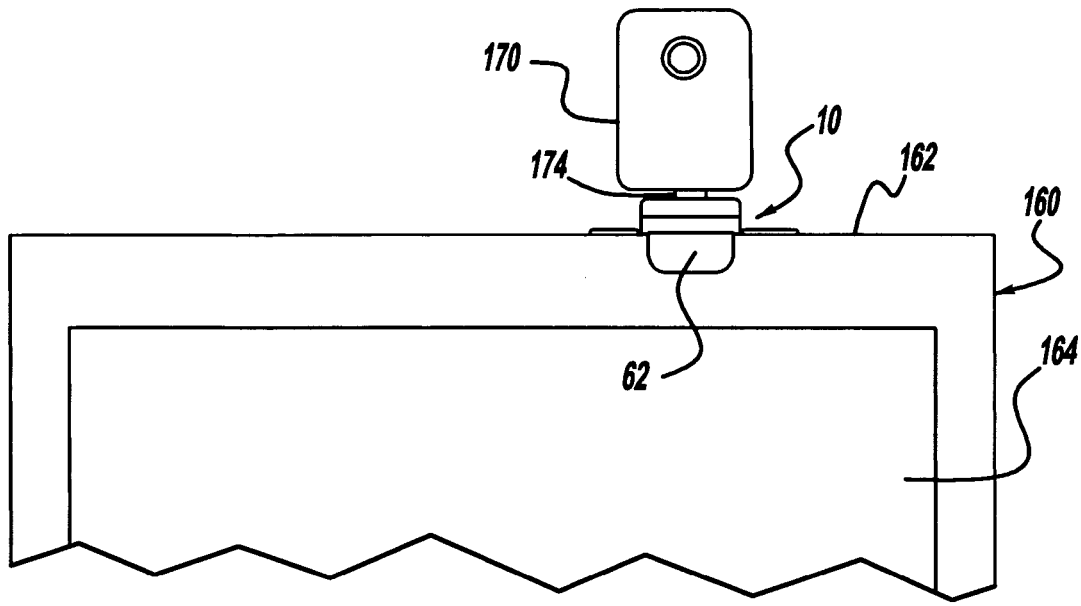
FIG. 8 is a front view of a computer monitor and a web camera mounted to the monitor with the clamping device of the invention.
Figure 9:
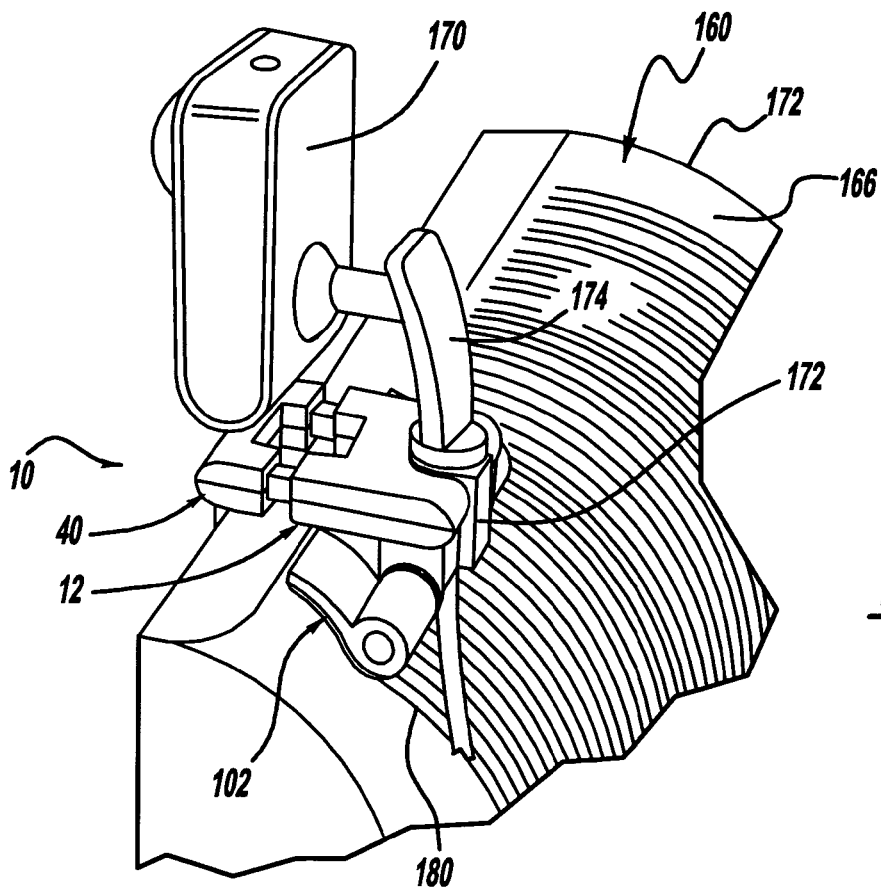
FIG. 9 is a back perspective view of the computer monitor and the web camera mounted to the monitor with the clamping device of the invention.

FIG. 8 is a front view of an LCD computer monitor 160 including a front panel 162 and an LCD screen 164. FIG. 9 is a back perspective view of the monitor 160 including a back panel 166. A web camera 170 is mounted to the monitor 160 with the clamping device 10. Particularly, a resilient mounting sleeve 172 is positioned over a mounting arm 174 connected to the web camera 170. The mounting sleeve 172 with the mounting arm 174 therein is then inserted into the cylindrical opening 30 in a friction fit so that the web camera 170 is rigidly secured to the clamping device 10. A cable of the web camera 170 extends through the arm 174.

Prior to the web camera 170 being secured to the clamping device 10, a user will grasp the clamping portion 40 and the body portion 12 to slide the clamping portion 40 away from the body portion 20 against the bias of the springs 80 and 90 and position the clamping device 10 on a top of the monitor 160. The extended member 62 is positioned against the front panel 162, where the ribs 34 provide a friction force to prevent the clamping device from sliding. The flippers 102 and 132 are positioned against a curved portion of the back panel 166 where the spring tension of the torsional springs 110 and 142 push the flippers 102 and 132, respectively, against the curved portion. The ribs 122 and 150 are inserted in parallel ventilation slots 180 in the back panel 166 so that a front end of the ribs 122 and 150 is positioned against a top end of the ventilation slots 180. In this configuration, the springs 80 and 90 provide a clamping force between the extended member 62 positioned against the front panel 162 and the front end of the ribs 122 and 150 positioned against the ends of the ventilation slots 180 to hold the clamping device 10 to the monitor 160. The spring force provided by the torsional springs 110 and 142 is not significant enough to interfere with the clamping force provided by the springs 80 and 90.

As discussed above, the clamping device 10 has particular application for clamping the web camera 170 to the LCD monitor 160 including the ventilation slots 180. However, the clamping device 10 also has application for clamping the web camera 170, or other object, to other types of monitors, including square monitors. For these types of monitors, the flippers 102 and 132 are rotated against the bias of the springs 110 and 142, respectively, until the flippers 102 and 132 are substantially aligned in an up and down manner relative to the bottom portion 16. In this position, the clamping force between the extended member 62 and the flippers 102 and 132 still provides the mechanism for securing the clamping device 10 to the computer monitor.

The foregoing discussion discloses and describes merely exemplary embodiments of the present invention. One skilled in the art will readily recognize from such discussion, and from the accompanying drawings and claims, that various changes, modifications or variations can be made therein without departing from the spirit and scope of the invention as defined in the following claims.

What is claimed is:

1. A clamping device for securing an object to a computer monitor, said device comprising:
  a body portion;
  a clamping portion slidably mounted to the body portion;
  at least one clamping spring secured to the body portion and the clamping portion for providing a spring bias for the clamping portion; and
  at least one flipper rotatably mounted to the body portion, said flipper including a flipper spring for providing a spring bias to the flipper where the at least one clamping spring provides a clamping force between the clamping portion and the at least one flipper to clamp the clamping device to the monitor.

2. The clamping device according to claim 1 wherein the clamping portion includes a first leg and a second leg each having a central bore, said at least one clamping spring being a first clamping spring and a second clamping spring where the first clamping spring is positioned within the bore of the first leg and includes a first end secured to the clamping portion and a second end secured to the body portion, and the second clamping spring is positioned within the bore of the second leg and includes a first end secured to the clamping portion and a second end secured to the body portion.

3. The clamping device according to claim 1 wherein the at least one flipper is a first flipper mounted to one side of the body portion and a second flipper mounted to an opposite side of the body portion, where both the first flipper and the second flipper include a flipper spring for providing a spring bias against the rotation of the flipper.

4. The clamping device according to claim 1 wherein the at least one flipper includes a plurality of parallel ribs, said parallel ribs being configured to be positioned within parallel ventilation slots in the computer monitor.

5. The clamping device according to claim 4 wherein the clamping device is secured to the computer monitor by a clamping force between the clamping portion and a front end of the ribs positioned against an end of the ventilation slots.

6. The clamping device according to claim 1 wherein the at least one flipper includes a resilient pad to be positioned against the monitor.

7. The clamping device according to claim 1 wherein the clamping portion includes a support portion to be positioned against a front panel of the monitor.

8. The clamping device according to claim 1 wherein the body portion includes a shaft, said at least one flipper spring being wound around the shaft and said at least one flipper being rotatably mounted to the shaft.

9. The clamping device according to claim 8 wherein the body portion includes a limit stop for limiting the rotation of the at least one flipper on the shaft.

10. The clamping device according to claim 1 wherein the monitor is an LCD monitor.

11. The clamping device according to claim 1 wherein the object is a web camera.

12. A clamping device for securing an object to a computer monitor, said computer monitor including a front panel and a back panel having ventilation slots, said device comprising:
   a body portion including a first shaft and a second shaft;
   a clamping portion slidably mounted to the body portion;
   at least one clamping spring mounted to the body portion and the clamping portion for providing a spring bias for the clamping portion;
   a first flipper rotatably mounted to the first shaft, said first flipper including a first flipper spring for providing a spring bias against the rotation of the first flipper on the first shaft, said first flipper further including a plurality of ribs to be inserted into ventilation slots in the computer monitor; and
   a second flipper rotatably mounted to the second shaft, said second flipper including a second flipper spring for providing a spring bias against the rotation of the second flipper on the second shaft, said second flipper further including a plurality of ribs to be inserted into the ventilation slots, wherein the at least one clamping spring provides a clamping force between the clamping portion and the first and second flippers to clamp the clamping device to the monitor.

13. The clamping device according to claim 12 wherein the clamping portion includes a first leg and a second leg each having a central bore, said at least one clamping spring being a first slide spring and a second slide spring where the first slide spring is positioned within the bore of the first leg and includes a first end secured to the clamping portion and a second end secured to the body portion, and the second slide spring is positioned within the bore of the second leg and includes a first end secured to the clamping portion and a second end secured to the body portion.

14. The clamping device according to claim 12 wherein the clamping portion includes a support portion to be positioned against the front panel of the monitor.

15. The clamping device according to claim 12 wherein the support portion includes a resilient pad including parallel ribs to be positioned against the front panel of the monitor.

16. The clamping device according to claim 12 wherein the first flipper and the second flipper each include a limit stop for limiting the rotation of the first flipper and the second flipper.

17. The clamping device according to claim 12 wherein the monitor is an LCD monitor.

18. The clamping device according to claim 12 wherein the object is a web camera.

19. A clamping device for securing a webcam to a computer monitor, said computer monitor including a front panel and a back panel having ventilation slots, said device comprising:
   a body portion including a first shaft and a second shaft;
   a clamping portion slidably mounted to the body portion, said clamping portion including a first leg and a second leg each having a central bore, said clamping portion further including an extended support portion;
   a first clamping spring positioned within the bore of the first leg and including a first end secured to the clamping portion and a second end secured to the body portion;
   a second clamping spring positioned within the bore of the second leg and including a first end secured to the clamping portion and a second end secured to the body portion;
   a first flipper rotatably mounted to the first shaft, said first flipper including a first flipper spring for providing a spring bias against the rotation of the first flipper on the first shaft, said first flipper further including a plurality of ribs to be inserted into the ventilation slots of the computer monitor; and
   a second flipper rotatably mounted to the second shaft, said second flipper including a second flipper spring for providing a spring bias against the rotation of the second flipper on the second shaft, said second flipper further including a plurality of ribs to be inserted into the ventilation slots, wherein the clamping device is secured to the computer monitor by a clamping force between the extended support portion and a front end of the ribs positioned against the ends of the ventilation slots.

20. The clamping device according to claim 19 wherein the support portion includes a resilient pad including parallel ribs to be positioned against the front panel of the monitor.

21. The clamping device according to claim 19 wherein the first flipper and the second flipper each include a limit stop for limiting the rotation of the first flipper and the second flipper.

22. The clamping device according to claim 19 wherein the monitor is an LCD monitor.

23. A clamping device for securing an object to a computer monitor, said device comprising:
   body portion means;
   clamping portion means for being slidably mounted to the body portion means;
   at least one clamping spring means for providing a spring bias between the body portion means and the clamping portion means; and
   at least one flipper means for being rotatably mounted to the body portion, said at least one clamping spring means providing a clamping force between the clamping portion means and the at least one flipper means to clamp the clamping device to the monitor.

24. The clamping device according to claim 23 wherein the clamping portion means includes a first leg and a second leg each having a central bore, said at least one clamping spring means being a first clamping spring and a second clamping spring where the first clamping spring is positioned within the bore of the first leg and includes a first end secured to the clamping portion means and a second end secured to the body portion means, and the second clamping spring is positioned within the bore of the second leg and includes a first end secured to the clamping portion means and a second end secured to the body portion means.

25. The clamping device according to claim 23 wherein the at least one flipper means is a first flipper mounted to one side of the body portion means and a second flipper mounted to an opposite side of the body portion means, where both the first flipper and the second flipper include a flipper spring for providing a spring bias against the rotation of the flipper.

26. The clamping device according to claim 23 wherein the at least one flipper means includes a plurality of parallel ribs, said parallel ribs being configured to be positioned within parallel ventilation slots in the computer monitor.

27. The clamping device according to claim 26 wherein the clamping device is secured to the computer monitor by a clamping force between the clamping portion means and a front end of the ribs positioned against an end of the ventilation slots.

28. The clamping device according to claim 23 wherein the body portion means includes a shaft, said at least one flipper spring means being wound around the shaft and said at least one flipper means being rotatably mounted to the shaft.

29. The clamping device according to claim 28 wherein the body portion means includes a limit stop for limiting the rotation of the at least one flipper means on the shaft.

* * * * *